US012584520B2

(12) United States Patent
Roth et al.

(10) Patent No.: US 12,584,520 B2
(45) Date of Patent: Mar. 24, 2026

(54) BEARING ASSEMBLY FOR A CONVERTER

(71) Applicant: Schaeffler Technologies AG & Co. KG, Herzogenaurach (DE)

(72) Inventors: Herbert Roth, Schweinfurt (DE); Philipp Weippert, Dettelbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 145 days.

(21) Appl. No.: 18/271,562

(22) PCT Filed: Jan. 12, 2022

(86) PCT No.: PCT/DE2022/100008
§ 371 (c)(1),
(2) Date: Jul. 10, 2023

(87) PCT Pub. No.: WO2022/152348
PCT Pub. Date: Jul. 21, 2022

(65) Prior Publication Data
US 2024/0068515 A1 Feb. 29, 2024

(30) Foreign Application Priority Data
Jan. 13, 2021 (DE) .......................... 102021100544.2

(51) Int. Cl.
*F16C 31/04* (2006.01)
(52) U.S. Cl.
CPC .................................... *F16C 31/04* (2013.01)
(58) Field of Classification Search
CPC ...... F16C 31/04; F16C 29/008; F16C 29/043; F16C 29/045; F16C 29/047
See application file for complete search history.

(56) References Cited

U.S. PATENT DOCUMENTS

| | | | |
|---|---|---|---|
| 3,170,737 A | 2/1965 | Denne, Jr. | |
| 3,291,541 A | 12/1966 | Dellinger | |
| 3,291,542 A | 12/1966 | North | |
| (Continued) | | | |

FOREIGN PATENT DOCUMENTS

| | | | |
|---|---|---|---|
| AT | 274870 B | 10/1969 | |
| DE | 401112 A | 8/1924 | |
| (Continued) | | | |

OTHER PUBLICATIONS https://www.merriam-webster.com/dictionary/bolt (Year: 2025).*
(Continued)

*Primary Examiner* — John Olszewski
*Assistant Examiner* — Aimee Tran Nguyen
(74) *Attorney, Agent, or Firm* — Volpe Koenig

(57) ABSTRACT

A bearing assembly, in particular for a converter, including a rolling bearing having an outer ring which is arranged in an inner housing, the inner housing being movable with respect to an outer housing in the axial direction of the rolling bearing by means of a two-row linear rolling bearing structure, and the rotational axes of all the rolling elements in each row of the linear rolling bearing structure lying in a common plane, and the two planes being at an oblique angle to one another. At least one anti-rotation element which engages in a mating contour in the outer housing is connected to the inner housing.

5 Claims, 2 Drawing Sheets

(56) References Cited

U.S. PATENT DOCUMENTS

| | | | |
|---|---|---|---|
| 3,311,427 | A | 3/1967 | Toth et al. |
| 2010/0046867 | A1* | 2/2010 | Hosmer ................. F16C 27/04 384/276 |

FOREIGN PATENT DOCUMENTS

| | | | |
|---|---|---|---|
| DE | 1253738 | A | 11/1967 |
| DE | 1583302 | B | 2/1971 |
| DE | 2415341 | C3 | 1/1975 |
| DE | 2500645 | A1 | 7/1975 |
| DE | 102012222595 | A1 | 6/2014 |
| GB | 429976 | A | 6/1935 |

OTHER PUBLICATIONS

International Search Report and Written Opinion for International Application No. PCT/DE2022/100008 dated Apr. 19, 2022, 13 pages long.
German Official Communication dated Aug. 19, 2021 for German Application No. 102021100544.2.

\* cited by examiner

BEARING ASSEMBLY FOR A CONVERTER

CROSS-REFERENCE TO RELATED APPLICATIONS

This application is the U.S. National Phase of PCT Appln. No. PCT/DE2020/100008, filed Jan. 12, 2022, which claims the benefit of German Patent Appln. No. 102021100544.2, filed Jan. 13, 2021, the entire disclosures of which are incorporated by reference herein.

TECHNICAL FIELD

The disclosure relates to a bearing assembly suitable for use in a converter.

BACKGROUND

A bearing assembly of the type in question is known from U.S. Pat. No. 3,291,541 A, for example. The known bearing assembly comprises a rolling bearing, designed as a two-row spherical rolling bearing, for supporting a trunnion of a converter. A housing part, in which the rolling bearing is accommodated, is movable with respect to a further, outer housing part in the axial direction of the rolling bearing, so as to provide overall the functionality of a floating bearing. According to U.S. Pat. No. 3,291,541 A, the relative movability of the two housing parts is achieved with the aid of a two-row linear rolling bearing structure. Each row of rolling bodies of the linear bearing structure is formed by barrel-shaped rolling bodies, wherein the rotational axes of the first row of rolling bodies lie in a first plane and the rotational axes of the second row of rolling bodies lie in a second plane, and the two planes form an obtuse angle of significantly less than 180°. This is equivalent to the fact that a radial line of a rolling body that can be associated with the first row forms an acute angle with a radial line of a rolling body that can be associated with the second row. According to U.S. Pat. No. 3,291,541 A, the point of intersection between the two radial lines should lie above the rotational axis of the trunnion mounted with the spherical rolling bearing, as a result of which a stable, self-aligning bearing unit is intended to be provided.

A converter is generally understood to mean an installation used in steel production, in which liquid pig iron is refined. Here, the pig iron is in a container which is lined with refractory material and which is mounted in a tiltable manner. Rolling bearings, in particular rolling bearings, can be used to mount the container, one of which acts as a fixed bearing and the other as a floating bearing. Owing to the temperature-related expansions that occur when the converter is in operation, it may be necessary to accommodate axial movements of multiples of 10 mm on the floating bearing.

In a bearing for tiltable converters described in DE 24 15 341 C3, a floating bearing function is provided by a pendulum support. Here, a pendulum support, which receives the bearing load, as well as a linkage bar arranged parallel to the pendulum support, is articulated on a support plate on which the bearing acting as a floating bearing is disposed, which can be a spherical plain bearing or a rolling bearing.

As an alternative to a linear rolling bearing structure or a pendulum support, a sliding sleeve can also be considered in order to realize a floating bearing function, as described in principle in AT 274870 B, for example. In this case, there is an anti-rotation device between a sliding sleeve and a so-called protective sleeve. An outer ring of a floating bearing is mounted in the sliding sleeve, with the associated inner ring being arranged rigidly on a trunnion of a converter.

Further designs of converters which are suspended on tilting trunnions are disclosed in documents DE 1 583 302 B and DE 1 253 738 A, for example.

In principle, a drive provided for tilting a converter can be located either on the side of the fixed bearing or on the side of the floating bearing. In the case of a drive for a converter described in DE 25 00 645 A1, there is a drive on the floating bearing side, with a plurality of crowned rollers being provided for torque transmission to a trunnion of the converter, which rollers engage in recesses in the trunnion and at the same time in recesses disposed in a driving machine part. With the help of the crowned rollers, the drive device according to DE 25 00 645 A1 should be able to receive both axial movements and angular deflections.

SUMMARY

The disclosure is based on the object of specifying a bearing assembly which has been developed further than the stated prior art, is particularly suitable for mounting a converter, is particularly robust and fulfills the function of a floating bearing and is characterized by operating properties which remain the same over the long term.

This object is achieved according to the disclosure by a bearing assembly having the features of claim 1. In a basic concept known per se, the bearing assembly comprises a rolling bearing, in particular in the form of a spherical roller bearing, which comprises an inner ring and an outer ring, with it being possible for the bearing rings to be designed in one part or in multiple parts. In any case, the outer ring is arranged in an inner housing, which is movable with respect to an outer housing in the axial direction of the rolling bearing by means of a two-row linear rolling bearing structure. In this case, the rotational axes of all the rolling bodies in each row of the linear rolling bearing structure lie in a common plane, wherein the two planes are positioned at an oblique angle to one another. According to the characterizing part of claim 1, at least one anti-rotation element is connected to the inner housing and engages in a mating contour on the side of the outer housing.

In addition to a self-centering effect, which is provided by the two-row, V-shaped linear rolling bearing structure, the separate anti-rotation device, which comprises at least one anti-rotation element on the side of the movable element, i.e. the inner housing, and an associated mating contour, in particular in the form of a longitudinal groove, on the side of the outer housing, ensures a constant angular relationship between the inner housing and the outer housing even in the case of long-term operation under high, changing forces. This ensures in particular that the rolling bodies, for example cylindrical rollers or barrel rollers, of the linear rolling bearing structure always roll in the same way on the associated raceways, which are stationary in relation to the inner housing or the outer housing.

The anti-rotation element can be arranged between the two rows of the linear rolling bearing structure, and in particular it can be located centrally between the two rows of rolling bodies of the linear bearing structure. In principle, instead of connecting the anti-rotation element to the inner housing, it is also possible to connect the anti-rotation element to the outer housing, in which case an associated mating contour should be provided on the inner housing. An integral design of the anti-rotation element and/or of the mating contour with the inner or outer housing is also possible. For example, contours of the anti-rotation device can be cast directly as contours of a housing part.

If the mating contour is not formed directly by the inner or outer housing, the mating contour can be designed in particular by sliding plates guiding the anti-rotation element. In an advantageous embodiment, the sliding plates are exchangeable elements of the bearing assembly.

In this case, each sliding plate can represent a one-sided termination of a plate located in the outer housing, the plate being supported on its side opposite the sliding plate against a bearing element of the linear rolling bearing structure. A rolling body raceway for the rolling bodies, in particular rollers, of the linear rolling bearing structure can be provided directly by this bearing element.

The plates mentioned can each be made in one part or in multiple part. In the case of a one-piece design, the sliding plate is an integral constituent part of the plate, and a friction-reducing coating may be present in that region of the plate which acts as a sliding plate directly interacting with the anti-rotation element. If, on the other hand, the sliding plate is designed as a separate element, it contacts a basic element of the plate, wherein the basic element is typically many times larger than the sliding plate and may differ from the sliding plate in terms of the materials and mechanical properties. The sliding surfaces formed by the sliding plates and contacting the anti-rotation element can lie in two mutually parallel planes, with the central axis of the rolling bearing, i.e. the tilt axis of the bearing assembly, being arranged between these two planes.

The thickness of the basic element is not uniform according to various possible embodiments. For example, the thickness of each basic element decreases outwardly from the sliding plate which is near a vertical median plane intersecting the central axis of the bearing assembly.

Irrespective of the exact geometric shape of the one-part or multi-part plate providing a mating contour for the anti-rotation device, the bearing element which is associated with the linear rolling bearing structure and which contacts the plate can be supported on its side facing away from the plate against a contour of the outer housing.

As far as the anti-rotation elements are concerned, a wide variety of geometric shapes are possible. For example, the anti-rotation device can comprise a single bolt-like anti-rotation element or a plurality of such bolt-like elements. In the latter case, a plurality of pin-like anti-rotation elements can be arranged in a row, which means that the central axes of all anti-rotation elements lie in a common plane. In this case, all anti-rotation elements engage in a single groove, which constitutes the mating contour of the anti-rotation device.

A groove-like mating contour of the anti-rotation device can also be provided in designs in which a single, rib-like anti-rotation element is present. In this case in particular, the rib-like or strip-like anti-rotation element can be formed directly either by the inner housing or by the outer housing of the bearing assembly.

The multi-part housing of the bearing assembly can be a plummer block housing overall. With regard to the technical background, reference is made to DE 401112 A and DE 10 2012 222 595 A1. The entire bearing assembly can be used in particular as a floating bearing for a converter bearing structure. Another rolling bearing, in particular in the form of a spherical rolling bearing, can be used as the associated fixed bearing.

BRIEF DESCRIPTION OF THE DRAWINGS

In the following, several exemplary embodiments of the disclosure are explained in more detail by means of a drawing. In the drawing.

DETAILED DESCRIPTION

Figure 1:
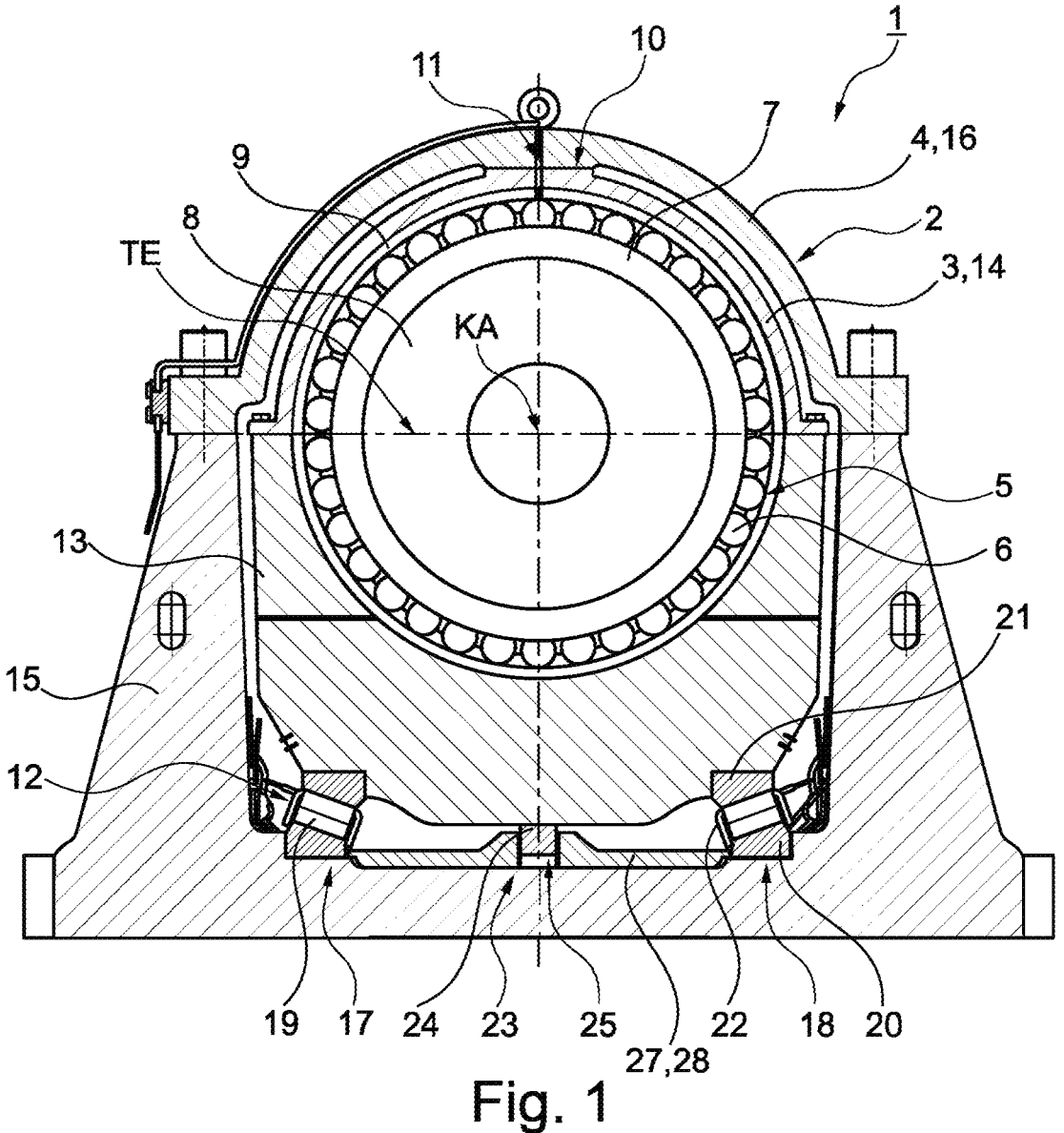
FIG. 1 shows a bearing assembly of a converter in an end view.

Unless otherwise stated, the following explanations relate to both exemplary embodiments. Parts which correspond to each other or which have basically the same effect are identified with the same reference sign in all the figures.

A bearing assembly identified overall by the reference sign 1 is designed as a floating bearing and is intended for use in a converter, which is not shown in any more detail. With respect to the basic function of the bearing assembly 1, reference is made to the prior art cited at the outset.

The bearing assembly 1 comprises a multi-part housing 2 with an inner housing 3 and an outer housing 4. A rolling bearing 5 designed as a spherical roller bearing, the rolling bodies of which, i.e. barrel rollers, are denoted by 6, has an inner ring 7 which is fixedly placed on a trunnion 8 of the converter. The central axis of the rolling bearing 5 and thus also of the trunnion 8 is referred to as the tilt axis KA of the bearing assembly 1.

The outer ring, denoted by 9, of the rolling bearing 5 is rigidly inserted into the inner housing 3, contacting both a lower housing inner part 13 and an upper housing inner part 14. The outer housing 4 is composed of a lower housing outer part 15 and an upper housing outer part 16 in a manner that is basically comparable to the inner housing 3. A horizontal parting plane TE of the inner housing 3 and of the outer housing 4 is level with the tilt axis KA. Deviating from the embodiment shown in FIGS. 1 and 2, designs can also be realized in which a spherical rolling bearing as the rolling bearing 5 is only in a lower part and the upper part is omitted.

Above the tilt axis KA there is a contact region 10 between the upper housing inner part 14 and the upper housing outer part 16. The contact region 10 has a lubricant channel 11 running through it, via which lubricant can be supplied to the rolling bearing 5. An O-ring seal is installed in the contact region 10, which ensures that grease supplied from the outside does not flow into the gap between the inner housing 3 and the outer housing 4, but passes through the bore located in the 12 o'clock position, i.e. the lubricant channel 11, through the inner housing 11 into the rolling bearing 5.

The inner housing 3 is movable to a limited extent in the outer housing 4 along the tilt axis KA by means of a linear rolling bearing structure 12, so as to provide the desired floating bearing function of the bearing assembly 1. The linear rolling bearing structure 12 is designed as a two-row rolling bearing structure, with two rows 17, 18 of rolling bodies 19, namely rollers, being arranged on the lower edge of the lower housing inner part 13. All central axes of the rolling bodies 19 in the first row 17 lie in a common plane. The same applies to the rolling bodies 19 in the second row 18. Each of the two planes is positioned at a slight oblique angle, which means that an acute angle is formed between the plane in question and the parting plane TE. An obtuse angle is thus formed between the two mentioned planes, which are defined by the position of the rolling bodies 19 and which intersect in a plane which is vertically laid through the tilt axis KA. Overall, a V-shape of the two-row linear rolling bearing structure 12 is provided. This V-shape of the linear rolling bearing structure 12 has a self-centering effect as far as the position of the inner housing 3 relative to the outer housing 4 is concerned.

Each row 17, 18 of rolling bodies 19 rolls, on the one hand, on a static bearing element 20 which is inserted into the lower housing outer part 15 and, on the other hand, on a movable bearing element 21 which is connected to the lower housing inner part 13. The contact angle at which loads are transmitted between the lower housing parts 13, 15 via the rolling bodies 19 is determined by the shape and position of the various bearing elements 20, 21, each in the form of strips. Cages in which the rolling bodies 19 of the linear rolling bearing structure 12 are guided are denoted by 22.

The cages 22 are designed in such a way that they are movable in the axial direction of the rolling bodies 19 with respect to the bearing elements 20 with only a small amount of play. This is achieved by overlapping each cage 22 with the associated bearing element 20. This also provides guidance for the rolling bodies 19 in their axial direction on the bearing element 20. It is also possible for the rolling bodies 19 to be guided by rims of the bearing elements 20, 21 of the linear rolling bearing structure 12.

In order to keep the angular relationship between the inner housing 3 and the outer housing 4 constant even in the event of sudden loads on the trunnion 8, regardless of whether and to what extent the inner housing 3 is moved with respect to the outer housing 4, an anti-rotation device 23 is provided. The anti-rotation device 23, which prevents the inner housing 3 from rotating about the tilt axis KA, comprises at least one anti-rotation element 23 which is arranged on the inner housing 3—more precisely, on the lower housing inner part 13—and which interacts with a mating contour 25 disposed on the side of the outer housing 4.

In the exemplary embodiments, the mating contour 25 is formed by sliding plates 26 which are disposed in the lower housing outer part 16. Each sliding plate 26 flanking the anti-rotation element 23 can be associated with a plate 28 which is inserted into the lower housing outer part 16 and contacts one of the two static bearing elements 20 on its side facing away from the anti-rotation element 23. The static bearing element 20 in turn is supported on a contour 29 of the outer housing 4, which means that ultimately forces acting in the circumferential direction of the rolling bearing 5 can be transmitted between the inner housing 3 and the outer housing 4. At the same time, the rolling body raceways, denoted by 30, of the static bearing elements 20, which are positioned at an oblique angle in a V-shape in the manner described, have a stabilizing effect. As far as the correct rolling of the rolling bodies 19 on the bearing elements 20, 21 over the entire service life is concerned, the precise guidance of the inner housing 3 in the outer housing 4, realized by means of the anti-rotation device 23, ensures constant geometric conditions.

Figures 2, 3, 4:
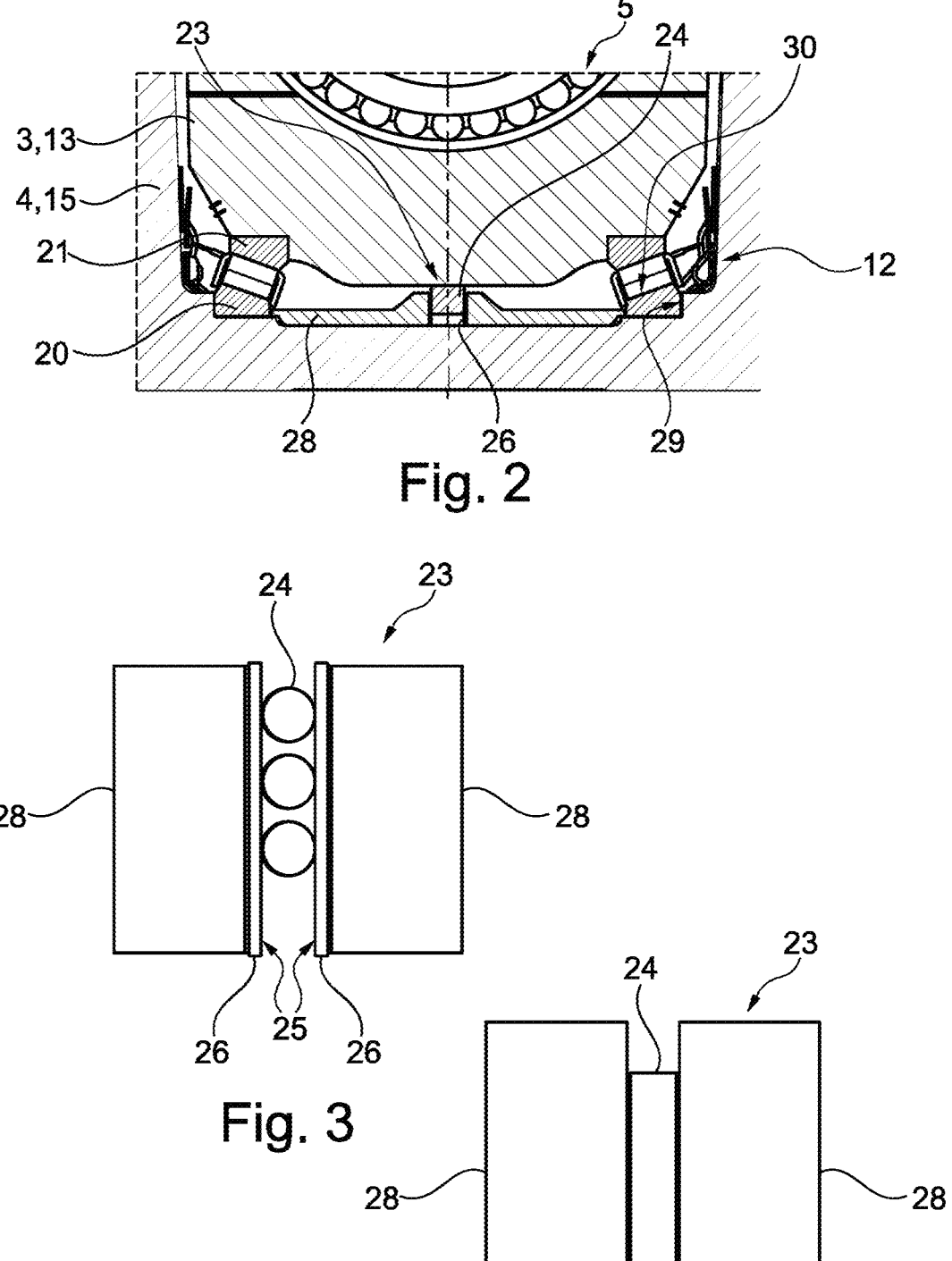
FIG. 2 shows a detail of the assembly according to FIG. 1.
FIG. 3 shows a schematic plan view of an anti-rotation device of the converter bearing assembly according to FIG. 1.
FIG. 4 shows an alternative design of an anti-rotation device for a bearing, namely floating bearing structure, of a converter in a view according to FIG. 3.

In the embodiment according to FIG. 1, as illustrated in FIG. 3, there are three bolt-like anti-rotation elements 24, which are inserted into the lower housing inner part 13. In this case, each anti-rotation element 24 makes contact with sliding plates 26, which are attached as separate elements to basic elements 27, which can also be associated with the plates 28. Embodiments with only two pin-like anti-rotation elements 24 or with more than three anti-rotation elements 24 are also possible. In all cases, the central axes of the cylindrical anti-rotation elements 24 intersect the tilt axis KA, with the anti-rotation elements 24 also being able to be formed directly by the lower housing inner part 13. In a modified design (not shown), the sliding plates 26 could bear directly against a contour of the lower housing outer part 15, in which case the sliding plates 26 would also be interchangeable. In all cases, the two sliding plates 26 lie in vertical planes which are parallel to one another.

Deviating from the exemplary embodiment according to FIGS. 1 to 3, in the exemplary embodiment according to FIG. 4 there is a single, strip-like anti-rotation element 24 which in this case shows an integral contour of the lower housing inner part 13. Likewise, the anti-rotation element 24 could also be connected to the lower housing part 13 as a separate element here, in particular inserted in a form-fitting manner into a depression in the lower housing part 13. The sliding plates 26 are formed directly by the plates 28 in the case outlined in FIG. 4. In a modified design, separate sliding plates 26 could also be provided in this case, which are supported on the outside, that is in the tangential direction of the rolling bearing 5, against a plate 28.

LIST OF REFERENCE SIGNS

1 Bearing assembly
2 Housing
3 Inner housing
4 Outer housing
5 Rolling bearing, spherical rolling bearing
6 Rolling body, barrel roller
7 Inner ring
8 Trunnion
9 Outer ring
10 Contact region
11 Lubricant channel
12 Linear rolling bearing structure
13 Lower housing inner part
14 Upper housing inner part
15 Lower housing outer part
16 Upper housing outer part
17 Row
18 Row
19 Rolling body
20 Static bearing element
21 Movable bearing element
22 Cage
23 Anti-rotation device
24 Anti-rotation element
25 Mating contour
26 Sliding plate
27 Basic element
28 Plate
29 Supporting contour of the outer housing
30 Rolling body raceway
KA Tilt axis
TE Parting plane

The invention claimed is:

1. A bearing assembly, comprising:
a rolling bearing having an outer ring arranged in an inner housing, the inner housing being movable with respect to an outer housing in an axial direction of the rolling bearing by a two-row linear rolling bearing structure having two rows of rolling bodies, and rotational axes of all the rolling bodies in each row of the two-row linear rolling bearing structure lying in a respective common plane, and the respective common planes being at an oblique angle to one another, and at least one anti-rotation element engaged in a mating contour in the outer housing is connected to the inner housing;

wherein the anti-rotation element is arranged centrally between the two rows of the linear rolling bearing structure;

wherein the mating contour which interacts with the anti-rotation element comprises first and second sliding plates; and wherein each sliding plate includes a plate located in the outer housing, which plate is supported against a bearing element of the linear rolling bearing structure, the bearing element providing a rolling body raceway of the linear rolling bearing structure.

2. The bearing assembly according to claim 1, wherein each sliding plate borders a respective plate located in the outer housing.

3. The bearing assembly according to claim 2, wherein each sliding plate is an integral constituent part of a respective plate located in the outer housing.

4. The bearing assembly according to claim 1, wherein the bearing element of the linear rolling bearing structure is supported on a side facing away from the plate against a contour of the outer housing.

5. The bearing assembly according to claim 1, wherein the at least one anti-rotation element comprises a plurality of cylindrical anti-rotation elements.

* * * * *